US009208599B2

(12) United States Patent
Subramanian et al.

(10) Patent No.: US 9,208,599 B2
(45) Date of Patent: Dec. 8, 2015

(54) VISUAL PREVIEWS

(75) Inventors: Sriram Subramanian, Bellevue, WA (US); Nitin Suri, Redmond, WA (US); William D. Sproule, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 818 days.

(21) Appl. No.: 12/817,298

(22) Filed: Jun. 17, 2010

(65) Prior Publication Data

US 2011/0310109 A1 Dec. 22, 2011

(51) Int. Cl.
*G06T 13/00* (2011.01)
*G06T 13/80* (2011.01)

(52) U.S. Cl.
CPC ....................................... *G06T 13/80* (2013.01)

(58) Field of Classification Search
CPC ....................................................... G06T 13/00
See application file for complete search history.

(56) References Cited

U.S. PATENT DOCUMENTS

| | | | |
|---|---|---|---|
| 5,999,173 A | 12/1999 | Ubillos | |
| 6,720,979 B1* | 4/2004 | Shrader | 715/723 |
| 8,645,870 B2* | 2/2014 | Berger et al. | 715/856 |
| 2002/0036640 A1* | 3/2002 | Akiyoshi et al. | 345/475 |
| 2002/0140740 A1* | 10/2002 | Chen | 345/810 |
| 2003/0228132 A1* | 12/2003 | Sucher et al. | 386/52 |
| 2004/0001106 A1 | 1/2004 | Deutscher et al. | |
| 2004/0066396 A1* | 4/2004 | Hatakenaka | 345/716 |
| 2005/0160368 A1* | 7/2005 | Liu et al. | 715/762 |
| 2007/0074115 A1* | 3/2007 | Patten et al. | 715/716 |
| 2007/0261006 A1* | 11/2007 | Reissmueller et al. | 715/837 |
| 2008/0005128 A1 | 1/2008 | Jayaraman et al. | |
| 2008/0066102 A1* | 3/2008 | Abraham et al. | 725/37 |
| 2008/0072166 A1* | 3/2008 | Reddy | 715/764 |
| 2008/0244398 A1* | 10/2008 | Santos-Gomez et al. | 715/708 |
| 2008/0304805 A1 | 12/2008 | Baharav et al. | |
| 2009/0153567 A1* | 6/2009 | Jung | 345/473 |
| 2009/0307623 A1* | 12/2009 | Agarawala et al. | 715/765 |
| 2010/0194763 A1* | 8/2010 | Niles et al. | 345/474 |
| 2010/0262911 A1* | 10/2010 | Kaplan et al. | 715/719 |
| 2011/0218997 A1* | 9/2011 | Boiman et al. | 707/737 |
| 2013/0343729 A1* | 12/2013 | Rav-Acha et al. | 386/285 |

OTHER PUBLICATIONS

Adobe After Effects, 2007, pp. 1-4.*

(Continued)

*Primary Examiner* — Stephen R Koziol
*Assistant Examiner* — Phong Nguyen
(74) *Attorney, Agent, or Firm* — Bryan Webster; Judy Yee; Micky Minhas

(57) ABSTRACT

Visual animation platforms may allow users to develop visual media projects, such as movies. Many visual animation platforms may provide animation effects that may be applied to visual elements of a visual media project. Unfortunately, current techniques for providing a preview of an animation effect may be limited. Accordingly, one or more systems and/or techniques for presenting a visual preview are disclosed herein. In particular, a snapshot of an original state of a selected visual element may be stored. A referenced animation effect may be applied to the selected visual element to generate an updated visual element that may be used to generate a visual preview of how the referenced animation effect may look as applied to the selected visual element. The snapshot may be applied to the updated visual element to nondestructively revert the updated visual element to the original state.

20 Claims, 9 Drawing Sheets

(56) References Cited

OTHER PUBLICATIONS

"Microsoft in Education PowerPoint 2001"—Published Date: Feb. 24, 2006, In and Out of the Classroom with Office 2001 for Mac, http://download.microsoft.com/download/f/e/3/fe31fcae-d85f-4bcd-a4f2-989dbb01907e/Tutorial.PowerPoint.doc.

"President Obama's Back to School Challenge—Movie Maker is Here to Help!"—Published Date: Sep. 9, 2009, Windows Live, http://windowslivewire.spaces.live.com/blog/cns!2F7EB29B42641D59!41430.entry.

Dolcourt, Jessica, "Windows Live Movie Maker"—Published Date: Aug. 21, 2009 http://www.cnet.com.au/windows-live-movie-maker-339298067.htm.

* cited by examiner

VISUAL PREVIEWS

BACKGROUND

Visual animation platforms may allow users to develop visual media projects comprising videos and/or other visual content. For example, a user may develop a movie comprising visual elements (e.g., sets of animation frames). The movie may be enhanced by applying animation effects, such as transitions and visual effects, to the visual elements. In one example, a user may apply a fadeout animation effect to a visual element comprising the last set of frames within the movie, thus giving the end of the movie a fadeout effect. In addition, the user may create new animation effects, such as a blur effect, that may be applied to visual elements within the movie. In this way, the user may generate a customized movie using the visual animation platform.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for presenting a visual preview are disclosed herein. It may be appreciated that a visual animation platform may allow users to develop a visual media project comprising one or more visual elements. For example, a visual media project may correspond to a movie comprising visual elements representing sets of animation frames. The visual animation platform may provide one or more animation effects that may be applied to visual elements (e.g., a black and white animation effect may be applied to a visual element, such that animation frames within the visual element may appear black and white).

Accordingly, a first user input comprising a referenced animation effect and a selected visual element may be received (e.g., after selecting the visual element, a user may hover over the animation effect within a ribbon menu). A snapshot of the selected visual element may be stored. That is, the snapshot may represent information (e.g., location data, existing animation effects, time data, and/or other properties of the visual element) corresponding to an original state of the selected visual element (e.g., a state of the selected visual element before the referenced animation effect is applied). It may be appreciated that the snapshot may be utilized to non-destructively revert the selected visual element back to its original state.

The referenced animation effect may be applied to the selected visual element to generate an updated visual element. For example, a fadeout animation effect may be applied to a sequence of animation frames to generate updated animation frames having a fadeout effect. It may be appreciated that the referenced animation effect may be selectively applied to a portion of the selected visual element to which the referenced animation effect is applicable, where the portion may comprise all or less than all of the selected visual element. For example, a fadeout animation effect may affect a final sequence of animation frames within a selected visual element. In order to reduce processing, the fadeout animation effect may be applied merely to the final sequence of animation frames to generate the updated visual element.

A visual preview may be generated based upon the updated visual element. In particular, the visual preview may be generated by selectively including a desired portion of the updated visual element (e.g., an interesting portion of the updated visual element that may be representative of how the visual effect looks) within the visual preview, where the desired portion may comprise all or less than all of the updated visual element. For example, the updated visual element may comprise a 30 minutes sequence of animation frames having a fadeout animation effect applied to the final 30 seconds. It may be advantageous to provide the user with a visual preview comprising the last 15 seconds of the updated visual element because the last 15 seconds may be a short and concise representation of how the fadeout animation effect looks. It may be appreciated that the visual preview may be derived from user content (the updated visual element), as opposed to a generic canned video. In this way, the visual preview may provide the user with a quick and relevant preview of how a referenced animation effect may look as applied to a selected visual element, without having to process an entire visual media project.

Second user input unreferencing the referenced animation effect may be received. For example, the user may hover off a user interface element corresponding to the referenced animation effect. The updated visual element may be reverted to the original state (e.g., the original state of the selected visual element before the referenced animation effect was applied) by applying the snapshot to the updated visual element. That is, the updated visual element may be non-destructively reverted back to the original state of the visual element. It may be appreciated that subsequent user input selecting various animation effects may be received. In this way, the user may quickly and easily view various visual previews of how referenced animation effects may look as applied to a selected animation element without losing the original state of the selected animation element.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
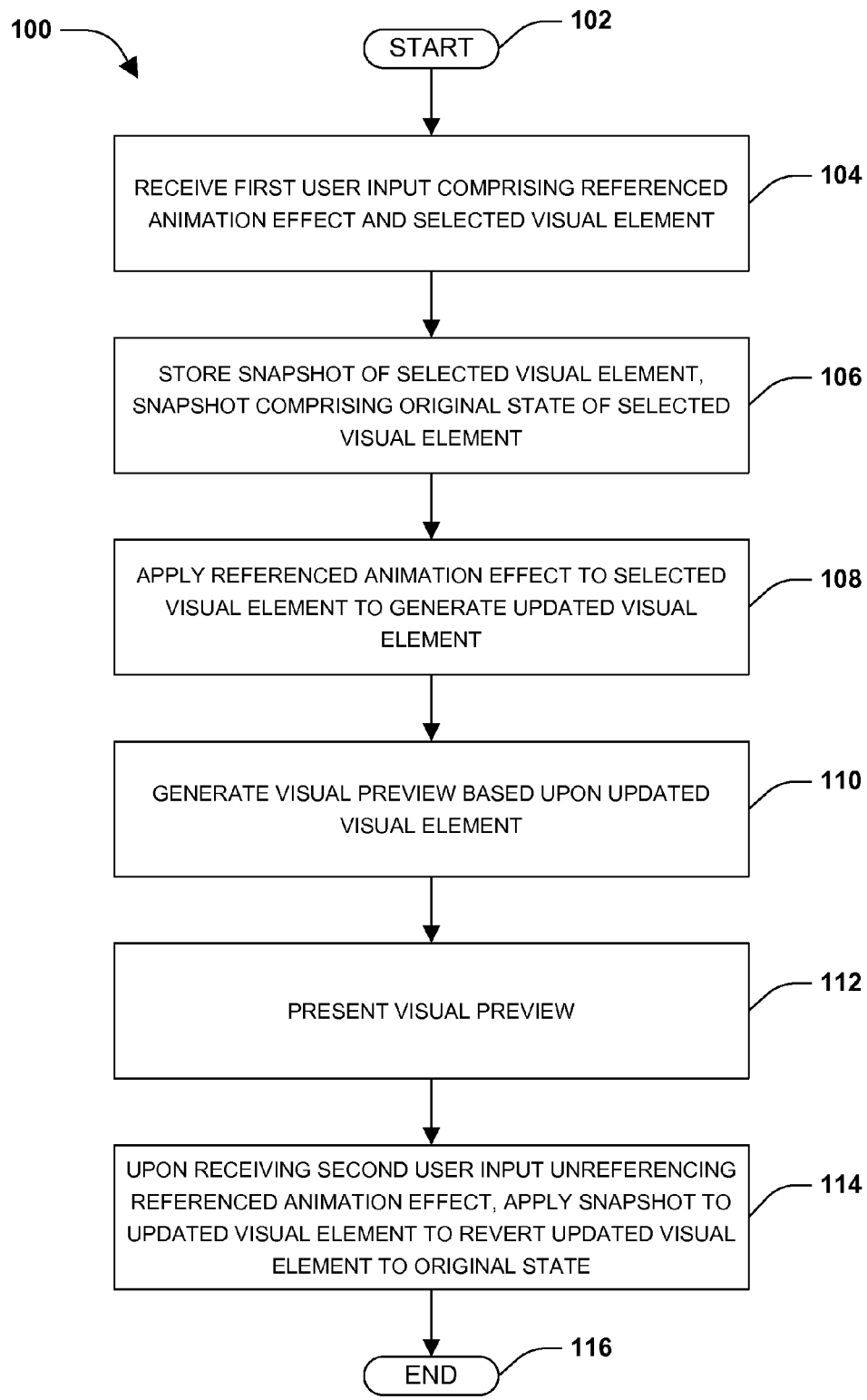
FIG. 1 is a flow chart illustrating an exemplary method of presenting a visual preview.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A visual animation platform may allow users to quickly and easily organize visual elements into a visual media project, such as a movie. Users may enhance their visual media project by applying animation effects, such as transitions and effects, to visual elements. For example, a visual animation platform may provide many (e.g., a hundred) preconfigured transitions and effects that may be applied to visual elements. Additionally, some visual animation platforms may allow users to generate their own animation effects.

Many visual animation platforms may attempt to provide a quick, easy, and intuitive experience for users to design and share movies with others. Unfortunately, applying animation effects to visual elements may be time consuming and complex due to a lack of a visual preview option. Current visual animation platforms may attempt to reduce the time lag by providing canned videos (e.g., generic content unrelated to the user's content) illustrating how the animation effect may look. However, the canned video may not quickly and effectively show the user how the animation effect may look on the user's content.

In another example of a current visual animation platform, the entire visual media project (e.g., a movie) may be processed, updated, and run in order for a user to visualize an animation effect. For example, the user may select a visual element. The user may invoke the visual animation platform to apply the animation effect to the visual element. It may be common for the user to wait a significant amount of time for the animation effect to be applied to the visual element due to the amount of processing performed by the visual animation platform. Once applied, the user may invoke the visual animation platform to play the movie. In this way, the user may finally see how the animation effect looks. Next, the user may select a second animation effect. The user may invoke the visual animation platform to apply the second animation effect to the visual element. Yet again, the user may wait a significant amount of time for the animation effect to be applied to the visual element due to the amount of processing performed by the visual animation platform. Again, the user may invoke the animation platform to play the movie so that the user may see how the second animation effect looks. Without visual previews, the user may spend a significant amount of time repeatedly applying animation effects and running the movie to see how various animation effects look. Additionally, an applied animation effect may not be able to be reverted back to an original form. Thus, the user may have to perform a (computationally expensive/intensive) undo operation after the application of every animation effect.

Accordingly, among other things, one or more systems and/or techniques for presenting a visual preview are provided herein. That is, a user may quickly scan through visual previews of how various animation effects may look on visual elements (user content), without undesirably long time lags associated with processing a visual media project. In generating a visual preview, the original state of the visual element may be preserved, so that the visual element may be quickly reverted back to its original state after the visual preview is shown. This allows the user to non-destructively preview animation effects on visual elements without committing to an update of the visual media project. In one example, a user may select a visual element comprising a sequence of animation frames. The user may hover over a fadeout effect user interface element. A visual preview of how the animation effect may look on the visual element may be presented to the user. It may be appreciated that the visual preview may comprise the entire updated visual element or merely an interesting portion of the updated visual element (e.g., a portion of the updated visual element representative of how the selected animation looks). Next, the user may hover off the fadeout effect button. The visual element may be non-destructively reverted back to its original state without the fadeout effect. In this way, the user may quickly preview animation effects on the visual element without committing to the animation effects.

It may be appreciated that referencing or unreferencing an animation effect for the purpose of viewing a visual preview may be different than selecting or unselecting an animation effect for the purposes of applying the animation effect to a visual element within a visual media project. For example, a visual element may have a previously "selected" animation effect already applied to the visual element. However, a user may want to see how an additional animation effect may look on the visual element. Thus, the user may merely reference the additional animation effect (e.g., a hover over action), which may be used to generate a visual preview of the additional animation effect applied to the visual element already comprising the "selected" animation effect.

It may be appreciated that a user may work with more than one visual element in a visual animation platform, but that a visual preview of an applied animation effect as provided herein is generally applied to a particular visual element (e.g., video) in a preview window or mode. That is, a user can have more than one visual element selected (e.g., to work within the platform), but when a user hovers over, for example, an animation effect, the effect is merely applied to the particular visual element in a preview pane, for example. Once a user selects an animation effect (e.g., is satisfied after viewing the preview), the effect may, however, be applied to all of the selected visual elements, or at least more than just the previewed one, that the user is working with in the platform.

One embodiment of presenting a visual preview is illustrated by an exemplary method 100 in FIG. 1. At 102, the method starts. At 104, a first user input comprising a referenced animation effect and a selected visual element may be received. For example, after selecting the visual element, a hover over action of a user interface element corresponding to the referenced animation effect may be received as the first user input. It may be appreciated that a visual element may comprise a still image, a set of sequential animation frames, a textual overlay, and/or other visual content that may be utilized in generating a visual media project. The animation effect may comprise transitions and/or other effects that may be utilized in generating a visual media project.

At 106, a snapshot of the selected visual element may be stored. It may be appreciated that a snapshot may represent information (e.g., location data, existing animation effects, time data, and/or other properties of the visual element) corresponding to an original state of the selected visual element (e.g., a state of the selected visual element before the referenced animation effect is applied). At 108, the referenced animation effect may be applied to the selected visual element to generate an updated visual element. It may be appreciated that the selected visual element is processed (updated with the referenced animation effect), as opposed to other less relevant portions of a visual media project comprising the selected visual element, which may reduce processing time. Additionally, the referenced animation effect may be selectively applied to a portion of the selected visual element to which the animation effect is applicable, which may reduce processing time. For example, the selected visual element may comprise 40 minutes of video. However, the selected animation affect may be applicable to the first 10 seconds of the video (e.g., a fade-in effect). Thus, the referenced animation effect may be selectively applied to the first 10 seconds of the video, as opposed to the entire 40 minutes.

At 110, a visual preview may be generated based upon the updated visual element. In one example, the visual preview may comprise a video clip corresponding to a pertinent portion of the updated visual element. That is, the visual preview may comprise a desired portion of the updated visual element, which may or may not comprise the entire updated visual element (e.g., the visual preview may comprise the first 10 seconds illustrating a fade-in effect, as opposed to the entire 40 minutes of the updated visual element). At 112, the visual preview may be presented. The visual preview may provide the user with some control of the playback of the visual preview (e.g., pause, fast forward, etc.) and/or may allow the user to commit to applying the referenced animation effect to some or all of the selected visual elements.

At 114, a second user input unreferencing the referenced animation effect may be received. For example, a hover off action of the user interface element corresponding to the referenced animation effect may be received as the second user input. In response to the second user input, the snapshot may be applied to the updated visual element to revert the updated visual element to the original state (e.g., an original state of the visual element before the application of the referenced animation effect, where the original state may, however, comprise one or more effects applied to the visual element before the referenced animation effect is selected and applied). It may be appreciated that in one example, the snapshot may not be applied to the updated visual element until the user is "done referencing animation effects". For example, the user may subsequently select other animation effects for preview before leaving a ribbon menu of animation effects. It may be advantageous to simply remove the previously applied animation effect corresponding to the previous visual preview, and apply the newly referenced animation effect corresponding to the new visual preview, without completely reverting the visual element back to the original state per the snapshot.

It may be appreciated that the user may subsequently select other animation effects for preview. For example, a third user input comprising a new referenced animation effect may be received. In one example, the new referenced animation effect may be applied to the selected visual element in the original state (e.g., the visual element after the snapshot was applied to the updated visual element to revert the updated visual element to the original state) to generate a new updated visual element. In another example, the previously applied animation effect may be removed from the selected visual element, and the new referenced animation effect may be applied to the selected visual element, without first reverting the selected visual element back to the originate state per the snapshot. This may occur, for example, where a user stays within an animation effect ribbon and merely mouses from one effect to another, thus allowing the user to preview different animation effects before selecting a desired animation effect to apply to the visual element. In any event, a new visual preview may be generated based upon the new updated visual element. The new visual preview may be presented. A fourth user input unreferencing (e.g., mousing off or hovering off) the new referenced animation effect may be received, for example. In response to the fourth user input, the snapshot may be applied to the new updated visual element to revert the new updated visual element to the original state (e.g., an original state of the visual element before the application of the referenced animation effect). At 116, the method ends.

Figure 2:
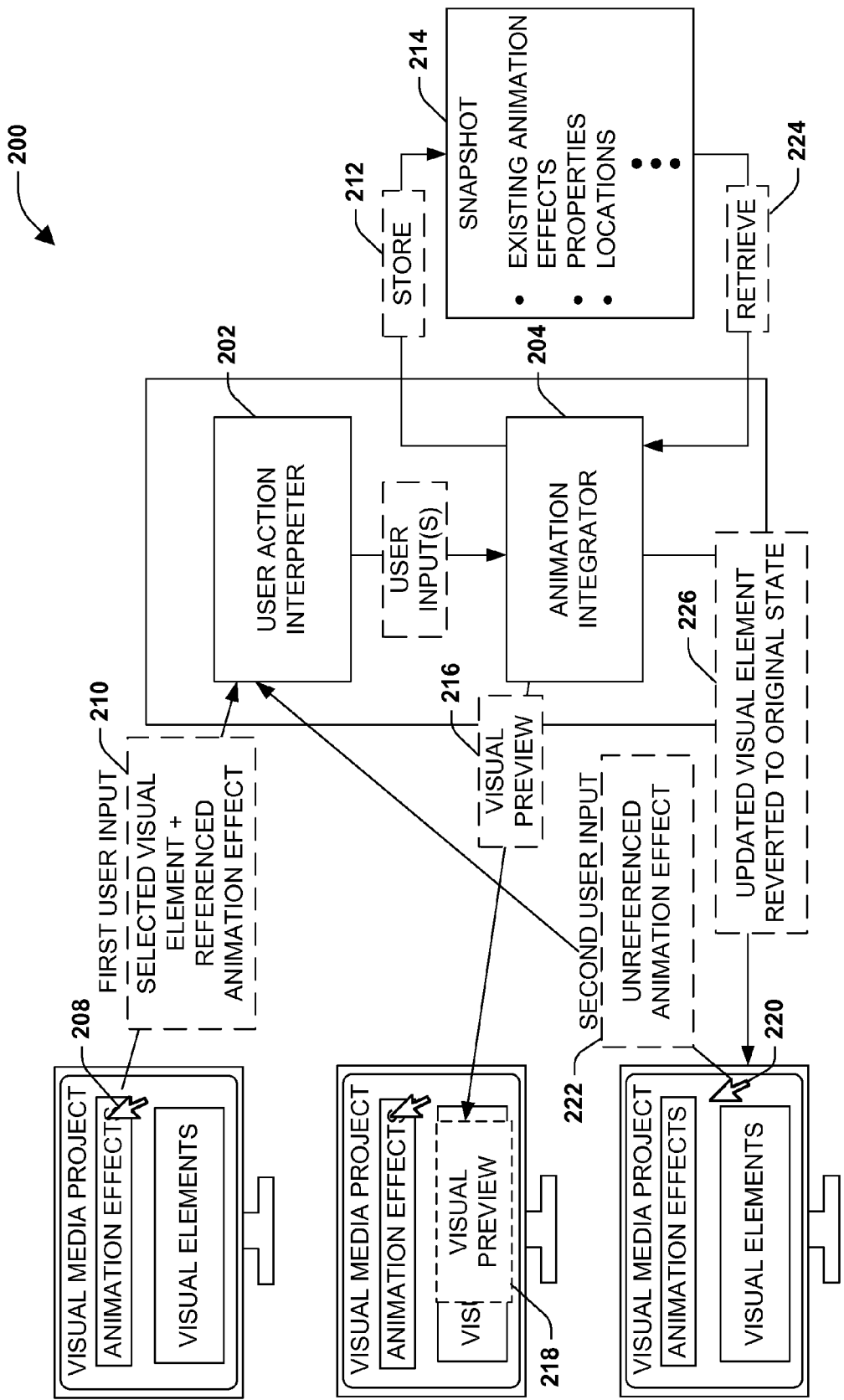
FIG. 2 is a component block diagram illustrating an exemplary system for presenting a visual preview.

FIG. 2 illustrates an example of a system 200 configured for presenting a visual preview 216. The system 200 may comprise a user action interpreter component 202 and/or an animation integrator component 204. The user action interpreter component 202 may be configured to receive user input referencing or unreferencing animation effects within a visual media project. The animation integrator component 204 may be configured to generate visual previews illustrating visual elements with animation effects.

In one example, the user action interpreter component 202 may be configured to receive a first user input 210 comprising a selected visual element and a selected visual effect. For example, a hover over action 208 of a user interface element corresponding to the referenced animation effect may be received as the first user input 210. The user action interpreter component 202 may be configured to notify the animation integrator component 204 of the first user input 210.

The animation integrator component 204 may be configured to store 212 a snapshot 214 of the selected visual element. The snapshot 214 may comprise an original state of the selected visual element. For example, the snapshot 214 may comprise existing animation effects, properties, location data, time data, and/or other information relating to the selected visual element. The animation integrator component 204 may be configured to apply the referenced animation effect to the selected visual element to generate an updated visual element. In one example, the animation integrator component 204 may be configured to selectively apply the referenced animation effect to a portion of the selected visual element to which the animation effect is applicable. In this way, the animation integrator component 204 may generate the visual preview 216 based upon the updated visual element. In one example, the animation integrator component 204 may selectively include a desired portion of the updated visual element within the visual preview 216. For example, the visual preview 216 may comprise a 10 second video clip of an interesting portion of the updated visual element, which may illustrate how the referenced animation effect may appear, where the updated visual element may comprise a video clip much longer than 10 seconds. The animation integrator component 204 may present 218 the visual preview 216.

The user action interpreter component 202 may be configured to receive a second user input 222 unreferencing the selected visual element. For example, a hover off action 220 of the user interface element corresponding to the referenced animation effect may be received as the second user input 222. The user action interpreter component 202 may be configured to notify the animation integrator component 204 of the second user input 222.

The animation integrator component 204 may be configured to retrieve 224 the snapshot 214. The animation integrator component 204 may be configured to apply the snapshot 214 to the updated visual element to revert the updated visual element to the original state. It may be appreciated that the application of the snapshot 214 may be accomplished in a non-destructive manner, such that the updated visual element may be returned to the original state as if the referenced animation effect was never applied to the selected visual element. Thus, the updated visual element reverted to its original state 226 may be presented within the visual media project.

In one example, while the visual preview is presented 218 (e.g., before the hover off action 220 is received), the animation integrator component 204 may receive user confirmation of the updated visual element. For example, the presentation 218 of the visual preview 216 may be confirmed by a user. In response to the user confirmation, the animation integrator component 204 may update the visual media project with the updated visual element. In this way, the user may non-destructively preview animation effects applied to user content (visual elements) and/or selectively apply desired animation effects to the user content.

Figure 3:
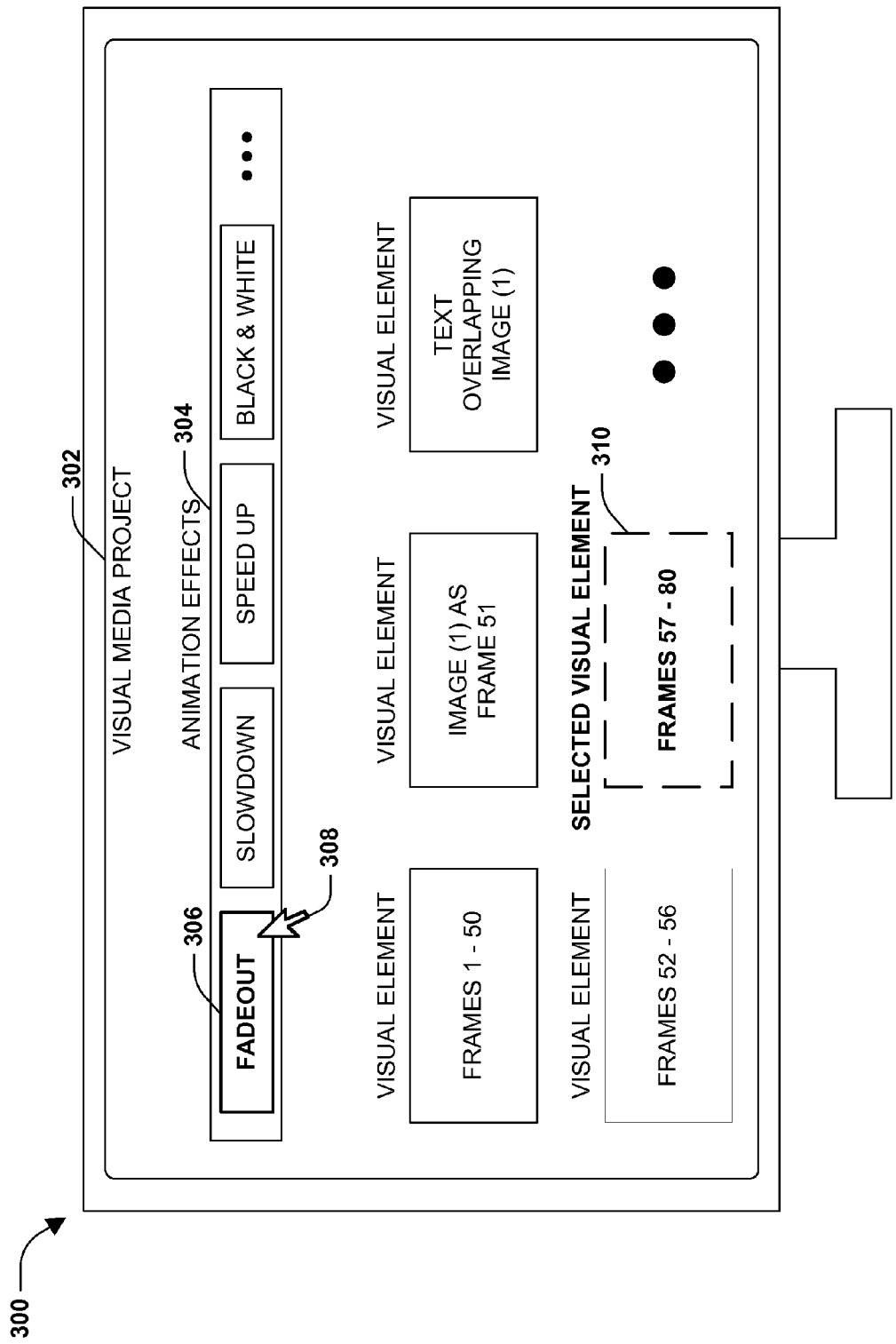
FIG. 3 is an illustration of an example of a visual media project.

FIG. 3 illustrates an example 300 of a visual media project 302. The visual media project 302 may comprise one or more visual elements (e.g., frames 1-50; image (1) as frame 51; text overlapping image (1); frames 52-65; frames 57-80; and/or other visual elements). For example, the visual elements may correspond to a movie. The visual media project 302 may have animation effects 304 that may be applied to visual elements. For example, a fadeout, a slowdown, a speed up, a black & white, and/or other animation effects may be applied to visual elements. Additionally, user input, such as a hover over action, may be used to view a visual preview of how an animation effect may look as applied to a visual element.

In one example, a user may select frames 57-80 as a selected visual element 310. In addition, the user may hover over 308 a fadeout referenced animation effect 306 using a cursor. In this way, a first user input comprising the selected visual element 310 and the fadeout referenced animation effect 306 may be received, for example, by a user action interpreter. It may be appreciated that the first user input may be utilized in non-destructively generating a visual preview of how the fadeout effect may look as applied to frames 57-80.

Figure 4:
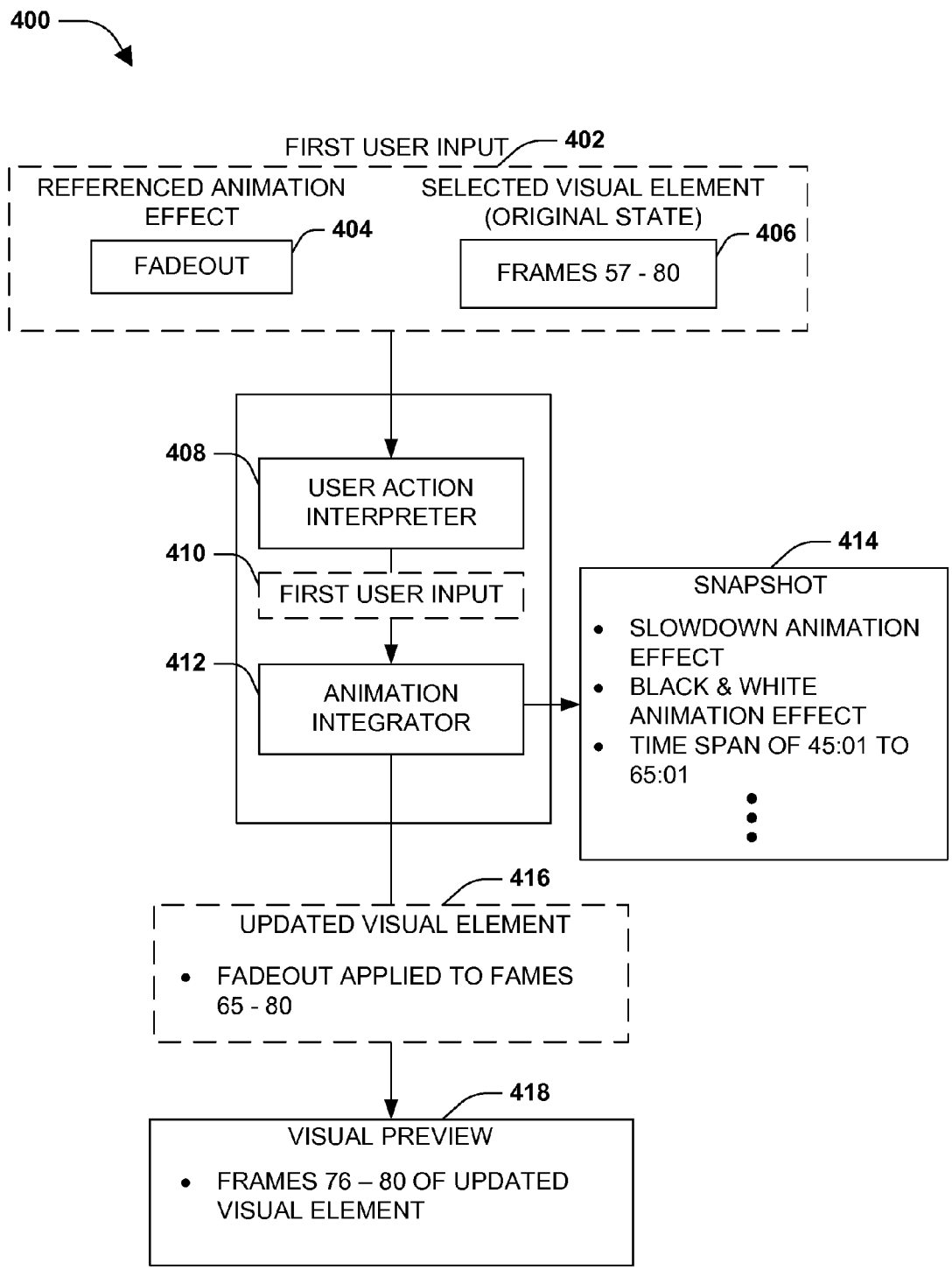
FIG. 4 is an illustration of an example of generating a visual preview.

FIG. 4 illustrates an example 400 of generating a visual preview 418, where an animation integrator component 412 configured to perform this functionality is implemented to accomplish the same in this example. A user action interpreter component 408 may be configured to receive first user input 402 comprising a fadeout referenced animation effect 404 and a selected visual element 406 corresponding to frames 57-80 in an original state. The user action interpreter component 408 may be configured to notify 410 the animation integrator component 412 of the first user input 402. The animation integrator component 412 may store a snapshot 414 of the selected visual element 406. For example, the snapshot 414 may comprise existing animation effects (e.g., slowdown, black & white, etc.), time information (e.g., frames 57-80 span a time frame from 45:01 to 65:01), and/or other information relating to the original state of frames 57-80.

The animation integrator component 412 may be configured to apply the fadeout referenced animation effect 404 to the selected visual element 406 to generate an updated visual element 416. For example, the fadeout effect may be applied to frames 65-80 because frames 57-64 are unaffected by the fadeout (e.g., the fadeout effect is an effect that fades out the last few frames of a visual element). The updated visual element 416 may comprise frames 57-64 in an original state and frames 65-80 with the fadeout effect applied. In this way, the fadeout referenced animation effect 404 is selectively applied to a portion (frames 65-80) of the selected visual element 406 to which the fadeout referenced animation effect 404 is applicable.

The animation integrator component 412 may generate the visual preview 418 based upon the updated visual element 416. For example, a desired portion (e.g., an interesting set of frames illustrating how a referenced animation effect may look) of the updated visual element may be selectively included within the visual preview 418. It may be appreciated that frames 65-80 may be interesting because the fadeout referenced animation effect 404 was applied to frames 65-80. However, frames 65-80 may account for several minutes of video content, which may be more video content than desired for a visual preview. Thus, frames 76-80 may be selectively included within the visual preview 418 because such frames are representative of how the fadeout referenced animation effect 404 may look when applied to the selected visual element 406. It may be appreciated that the visual preview 418, in some instances, may comprise the entire updated visual element based upon various conditions, such as the type of animation effect applied, a time span of the updated visual element, etc.

Figure 5:
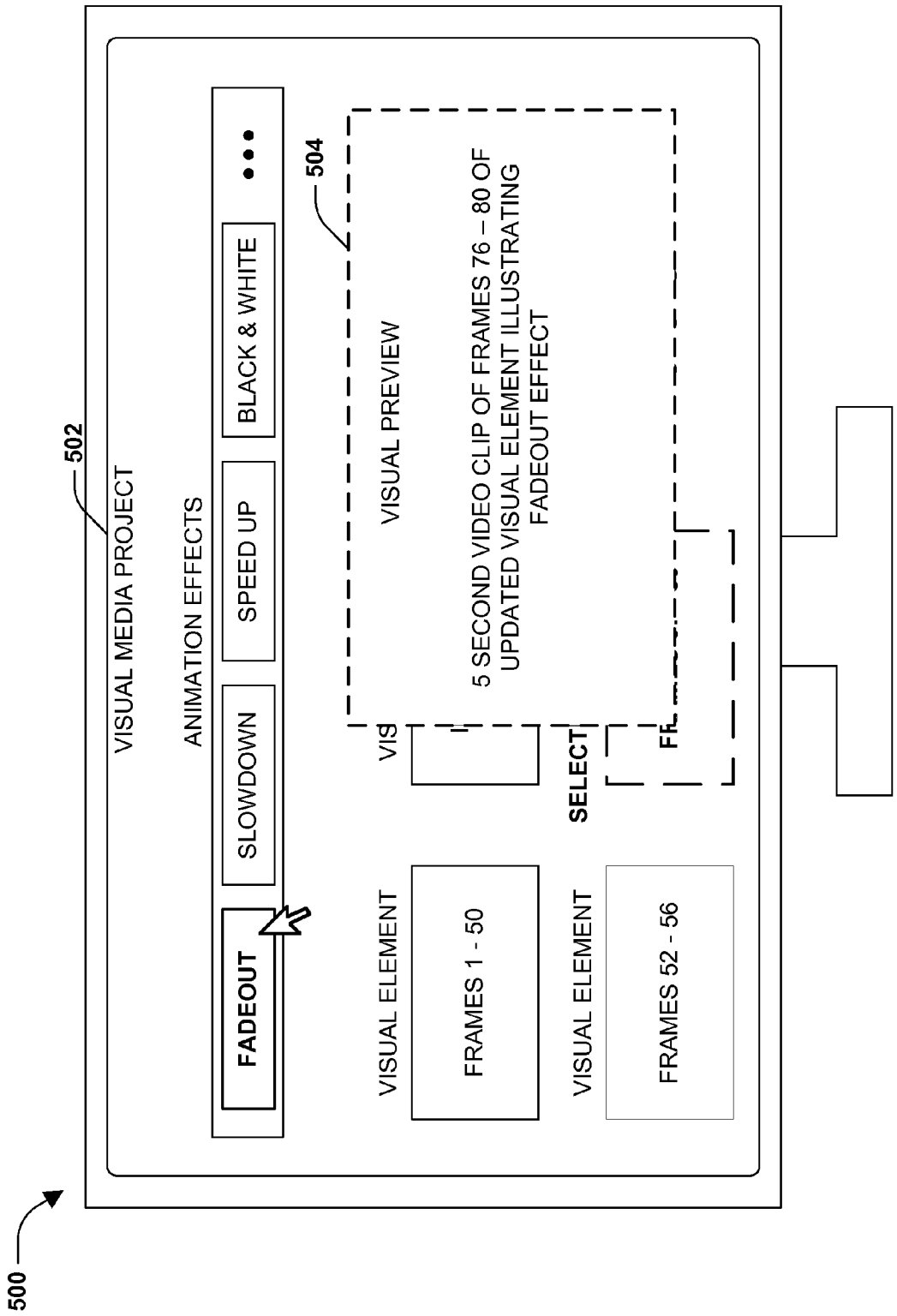
FIG. 5 is an illustration of a visual preview.

FIG. 5 illustrates an example 500 of a visual preview 504. It may be appreciated that the visual preview 504 may have been generated based upon an updated visual element created from a referenced animation effect (e.g., FIG. 4). For example, a selected visual element corresponding to frames 57-80 of a visual media project 502 may have been selected by a user. Additionally, the user may have hovered over a fadeout referenced animation effect. The visual preview 504 may have been generated based upon an updated visual element derived from the selected visual element and the fadeout referenced animation effect. That is, the visual preview 504 may provide a short and interesting preview of how the fadeout referenced animation effect may look as applied to the selected visual element. For example, the visual preview 504 may comprise a 15 second video clip derived from frames 76-80 of the updated visual element illustrating the fadeout effect as applied to the selected visual element.

Figure 6:
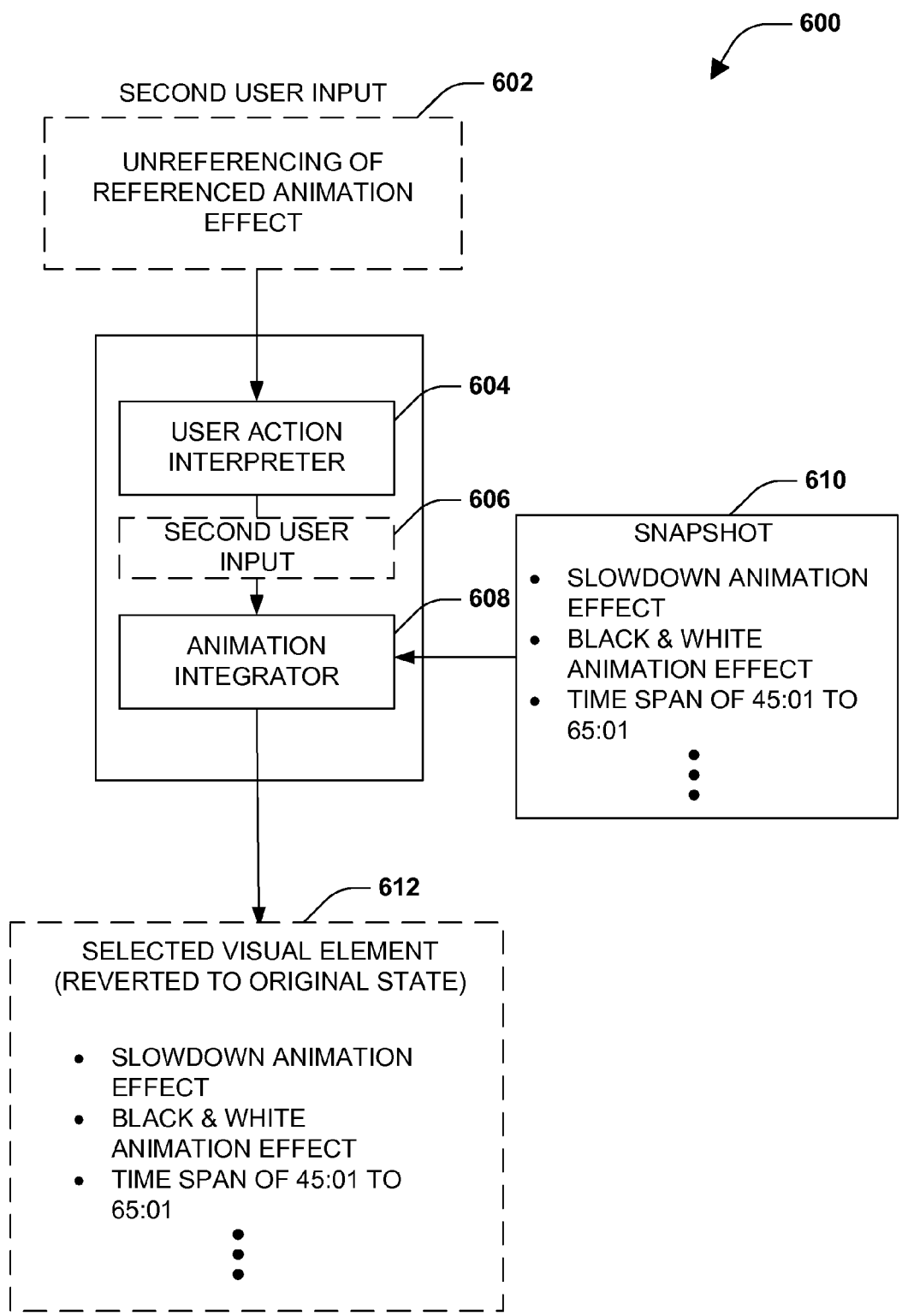
FIG. 6 is an illustration of an example of reverting an updated visual element to an original state.

FIG. 6 illustrates an example 600 of reverting an updated visual element to an original state. It may be appreciated that a referenced animation effect may have been applied to a selected visual element to generate an updated visual element (e.g., FIG. 5). Before generating the updated visual element, a snapshot 610 may have been stored. The snapshot 610 may comprise information relating to an original state of the selected visual element before the referenced animation effect was applied. In this way, the snapshot 610 may be utilized in reverting the updated visual element to its original state.

In one example, a second user input 602 may be received by a user action interpreter component 604. The second user input 602 may correspond to user input unreferencing a referenced animation effect. For example, a user may hover off a cursor from a fadeout animation effect within a ribbon menu. The user action interpreter component 604 may be configured to notify 606 an animation integrator component 608 of the second user input 602. The animation integrator component 608 may be configured to retrieve the snapshot 610. The animation integrator component 608 may apply the snapshot 610 to the updated visual element to revert the updated visual element to the original state (e.g., selected visual element (reverted to original state) 612). It may be appreciated that the application of the snapshot may be non-destructive. That is, the original state may be achieved without information or data loss, as if the referenced animation effect was never applied to the selected visual element. In this way, a visual element may be reverted back to an original state after a video preview is presented.

Figure 7:
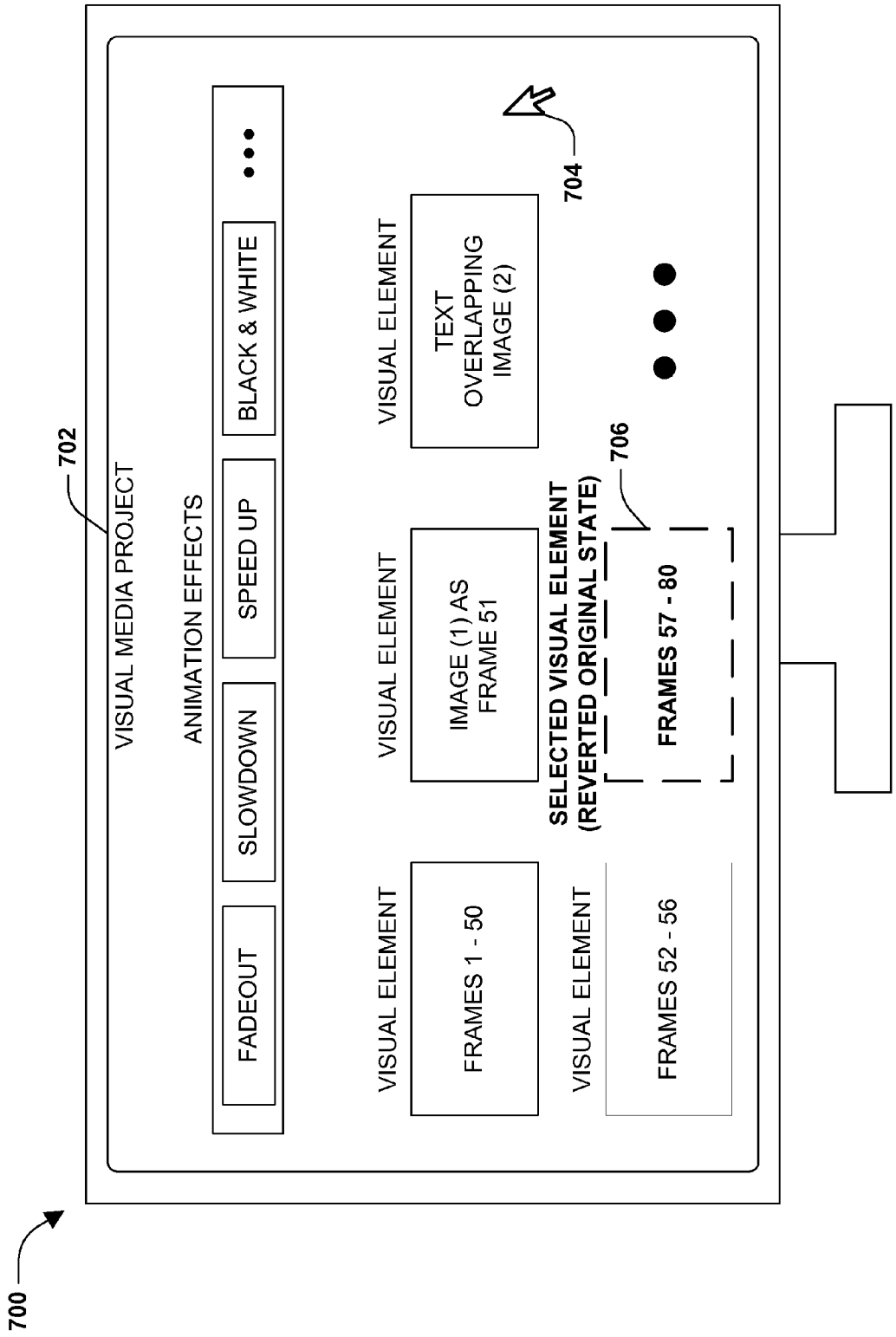
FIG. 7 is an illustration of an example of a visual media project comprising a selected visual element reverted to an original state.

FIG. 7 illustrates an example 700 of a visual media project 702 comprising a selected visual element (reverted to an original state) 706. It may be appreciated that a selected visual element and/or a fadeout animation effect may have been used to generate an updated visual element and/or a visual preview (e.g., FIG. 6). For example, a user may have selected the selected visual element, and subsequently hovered over the fadeout animation effect using a cursor. In this way, the fadeout animation effect may have been applied to the selected visual element to generate an updated visual element, which may have been used to generate a visual preview. The user may have hovered off 704 the cursor from the fadeout animation effect. In this way, a snapshot of the original state corresponding to the selected visual element may have been applied to the updated visual element to revert the updated visual element to the original state. In this way, the selected visual element (reverted to the original state) 716 may be presented within the visual media project 702. That is, frames 57-80 may be in an original state, as if the fadeout effect was never applied. In this way, a user may non-destructively view visual previews of animation effects applied to visual elements without losing the original states of the visual elements (e.g., where the original states may comprise one or more previously applied animation effects).

Figure 8:
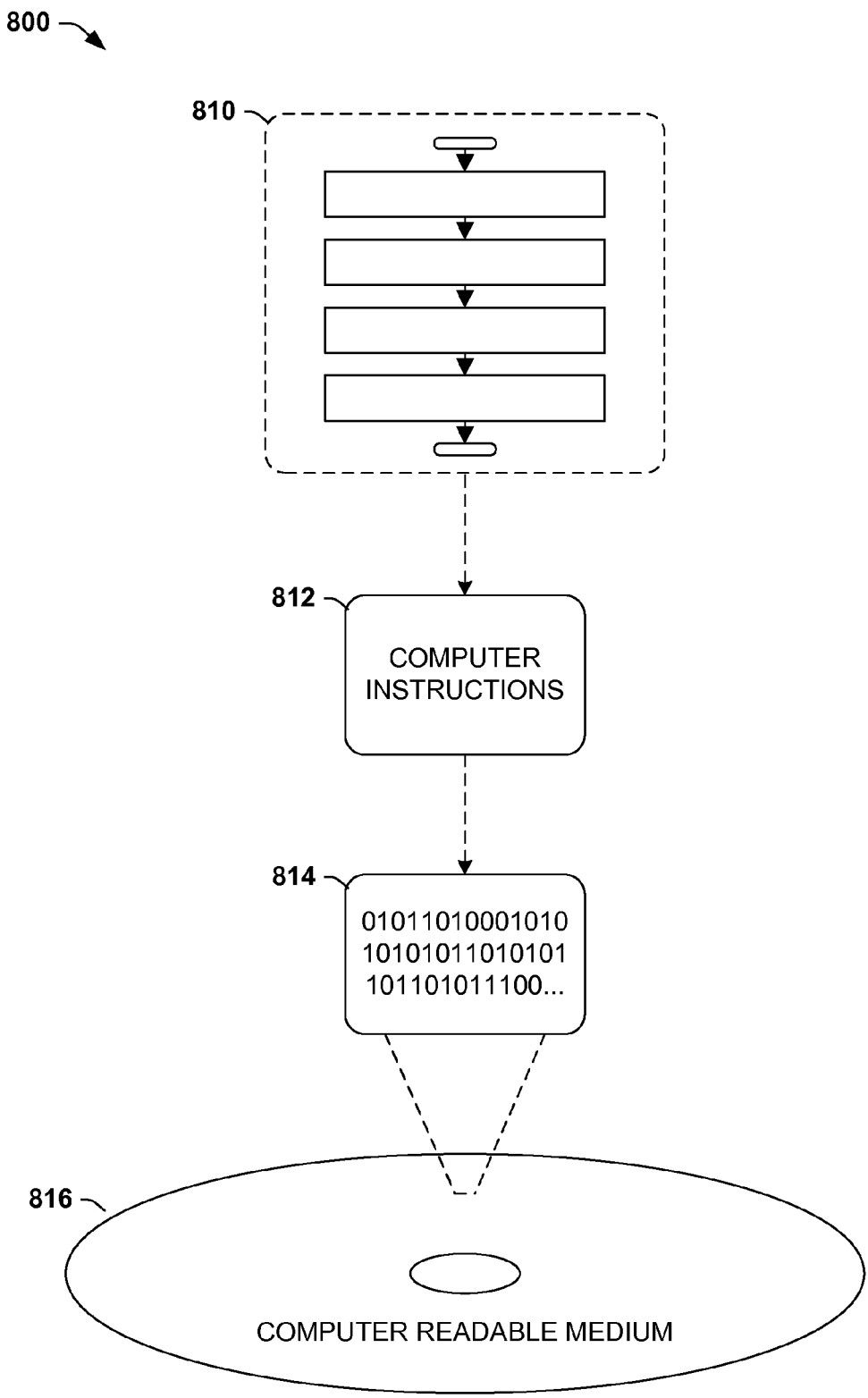
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as the exemplary method 100 of FIG. 1, for example. In another such embodiment, the processor-executable instructions 812 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
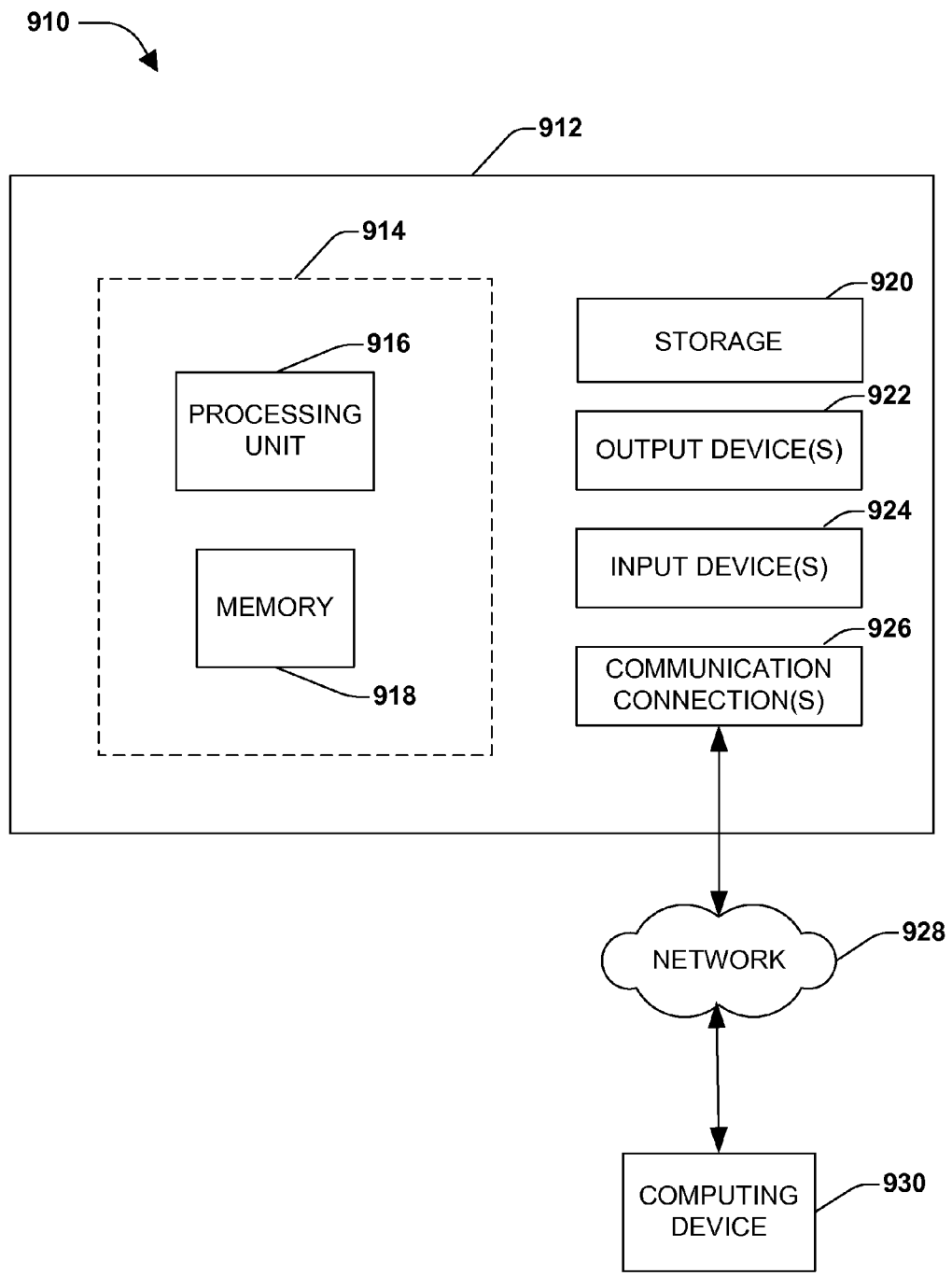
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for presenting a visual preview, comprising:
receiving a first user input comprising a referenced animation effect, a first selected visual element, and a second selected visual element;
storing a snapshot of the first selected visual element, the snapshot comprising an original state of the first selected visual element;
generating an updated visual element based upon the referenced animation effect and the first selected visual element such that a first portion of the updated visual element corresponds to a first portion of the first selected visual element modified by the referenced animation effect while a second portion of the updated visual element corresponds to a second portion of the first selected visual element not modified by the referenced animation effect, the referenced animation effect modifying the first portion of the first selected visual element and not modifying the second portion of the first selected visual element based upon the referenced animation effect being applicable to the first portion of the first selected visual element;
generating a first visual preview based upon the updated visual element, the first visual preview including some but not all of the first portion of the updated visual element based upon a determination that some but not all of the first portion of the updated visual element is representative of an appearance of the referenced animation effect;

presenting the first visual preview without concurrently presenting a second visual preview based upon the second selected visual element;

upon receiving a second user input confirming the presentation of the first visual preview, applying the referenced animation effect to the first selected visual element and the second selected visual element; and upon receiving a third user input unreferencing the referenced animation effect, applying the snapshot to the updated visual element to revert the updated visual element to the original state.

2. The method of claim 1, the referenced animation effect comprising a black and white animation effect.

3. The method of claim 1, the referenced animation effect comprising a slowdown animation effect.

4. The method of claim 1, the referenced animation effect comprising a speed up animation effect.

5. The method of claim 1, the referenced animation effect comprising a fadeout animation effect.

6. The method of claim 1, the referenced animation effect comprising a fade-in animation effect.

7. The method of claim 1,
the receiving a first user input comprising:
receiving a hover over action of a user interface element corresponding to the referenced animation effect.

8. The method of claim 1, comprising:
receiving a fourth user input comprising a new referenced animation effect;
generating a new updated visual element based upon the new referenced animation effect and the first selected visual element;
generating a new visual preview based upon the new updated visual element; and
presenting the new visual preview.

9. The method of claim 1, the first selected visual element different than the second selected visual element.

10. A system for presenting a visual preview, comprising:
one or more processing units; and
memory comprising instructions that when executed by at least one of the one or more processing units, implement at least some of:
an animation integrator component configured to:
store a snapshot of a first selected visual element, the snapshot comprising an original state of the first selected visual element;
generate an updated visual element based upon a referenced animation effect and the first selected visual element such that a first portion of the updated visual element corresponds to a first portion of the first selected visual element modified by the referenced animation effect while a second portion of the updated visual element corresponds to a second portion of the first selected visual element not modified by the referenced animation effect, the referenced animation effect modifying the first portion of the first selected visual element and not modifying the second portion of the first selected visual element based upon the referenced animation effect being applicable to the first portion of the first selected visual element;
generate a first visual preview based upon the updated visual element, the first visual preview including some but not all of the first portion of the updated visual element based upon a determination that some of the first portion of the updated visual element is representative of an appearance of the referenced animation effect;

present the first visual preview without concurrently presenting a second visual preview based upon a second selected visual element;

upon receiving a second user input confirming the presentation of the first visual preview, apply the referenced animation effect to the first selected visual element and the second selected visual element; and upon receiving a third user input unreferencing the referenced animation effect, apply the snapshot to the updated visual element to revert the updated visual element to the original state.

11. The system of claim 10, the first selected visual element different than the second selected visual element.

12. The system of claim 10, the original state comprising an existing animation effect applied to the first selected visual element.

13. The system of claim 10, the animation integrator component configured to:
automatically generate the first visual preview.

14. The system of claim 10, the first selected visual element comprised within a visual media project.

15. The system of claim 14, the animation integrator component configured to:
apply the referenced animation effect to the first selected visual element and the second selected visual element without altering other portions of the visual media project.

16. The system of claim 10, the instructions when executed implementing at least some of a user action interpreter component configured to:
receive a hover over action of a user interface element corresponding to the referenced animation effect.

17. The system of claim 16, the user action interpreter component configured to:
receive a hover off action of the user interface element corresponding to the referenced animation effect.

18. The system of claim 10, the referenced animation effect comprising a black and white animation effect, a slowdown animation effect, a speed up animation effect, a fadeout animation effect or a fade-in animation effect.

19. A computer readable medium, excluding signals, comprising instructions that when executed, perform operations for presenting a visual preview, comprising:
receiving a first user input comprising a referenced animation effect and a first selected visual element;
storing a snapshot of the first selected visual element, the snapshot comprising an original state of the first selected visual element;
generating an updated visual element based upon the referenced animation effect and the first selected visual element such that a first portion of the updated visual element corresponds to a first portion of the first selected visual element modified by the referenced animation effect while a second portion of the updated visual element corresponds to a second portion of the first selected visual element not modified by the referenced animation effect, the referenced animation effect modifying the first portion of the first selected visual element and not modifying the second portion of the first selected visual element based upon the referenced animation effect being applicable to the first portion of the first selected visual element;
generating a first visual preview based upon the updated visual element, the first visual preview including some but not all of the first portion of the updated visual element based upon a determination that some but not all of the first portion of the updated visual element is representative of an appearance of the referenced animation effect;
presenting the first visual preview without concurrently presenting a second visual preview based upon a second visual element;
upon receiving a second user input confirming the presentation of the first visual preview, applying the referenced animation effect to the first selected visual element and the second visual element; and
upon receiving a third user input unreferencinq the referenced animation effect, applying the snapshot to the updated visual element to revert the updated visual element to the original state.

20. The computer readable medium of claim 19, the referenced animation effect comprising a black and white animation effect, a slowdown animation effect, a speed animation effect, a fadeout animation effect or a fade-in animation effect.

\* \* \* \* \*